US008566644B1

(12) United States Patent
Righi et al.

(10) Patent No.: US 8,566,644 B1
(45) Date of Patent: *Oct. 22, 2013

(54) SYSTEM AND METHOD FOR DEBUGGING A TARGET COMPUTER USING SMBUS

(75) Inventors: Stefano Righi, Lawrenceville, GA (US); Ashraf Javeed, Norcross, GA (US)

(73) Assignee: American Megatrends, Inc., Norcross, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/183,076

(22) Filed: Jul. 14, 2011

Related U.S. Application Data

(63) Continuation of application No. 11/300,045, filed on Dec. 14, 2005, now Pat. No. 8,010,843.

(51) Int. Cl.
*G06F 11/00* (2006.01)
(52) U.S. Cl.
USPC .......................................................... 714/32
(58) Field of Classification Search
USPC .......................................................... 714/32
See application file for complete search history.

(56) References Cited

U.S. PATENT DOCUMENTS

| | | | |
|---|---|---|---|
| 4,589,068 A | 5/1986 | Heinen, Jr. | |
| 4,979,074 A | 12/1990 | Morley et al. | |
| 5,228,039 A | 7/1993 | Knoke et al. | |
| 5,379,409 A | 1/1995 | Ishikawa | |
| 5,388,252 A | 2/1995 | Dreste et al. | |
| 5,455,933 A | 10/1995 | Schieve et al. | |
| 5,491,743 A | 2/1996 | Shiio et al. | |
| 5,615,331 A * | 3/1997 | Toorians et al. | ............. 714/5.11 |
| 5,625,410 A | 4/1997 | Washino et al. | |
| 5,630,049 A | 5/1997 | Cardoza et al. | |
| 5,732,212 A | 3/1998 | Perholtz et al. | |
| 5,777,874 A | 7/1998 | Flood et al. | |
| 5,815,653 A | 9/1998 | You et al. | |
| 5,819,093 A | 10/1998 | Davidson et al. | |
| 5,850,562 A | 12/1998 | Crump et al. | |
| 5,878,158 A | 3/1999 | Ferris et al. | |
| 5,953,451 A | 9/1999 | Syeda-Mahmood | |
| 5,990,852 A | 11/1999 | Szamrej | |
| 5,991,546 A | 11/1999 | Chan et al. | |
| 6,011,920 A | 1/2000 | Edwards et al. | |
| 6,035,059 A | 3/2000 | Kurosawa et al. | |
| 6,054,676 A | 4/2000 | Wall et al. | |
| 6,055,334 A | 4/2000 | Kato | |
| 6,065,072 A | 5/2000 | Flath | |
| 6,067,407 A | 5/2000 | Wadsworth et al. | |
| 6,115,645 A | 9/2000 | Berar | |
| 6,119,247 A | 9/2000 | House et al. | |

(Continued)

OTHER PUBLICATIONS

"Cable Allows Users to Extend DVI Connections," Jul. 31, 2001, *The Mac Observer*, printed from http://www.macobserver.com/article/2001/07/31.11.shtml, 4 pages.

(Continued)

*Primary Examiner* — Scott Baderman
*Assistant Examiner* — Jigar Patel
(74) *Attorney, Agent, or Firm* — Hope Baldauff, LLC

(57) ABSTRACT

Methods and systems for debugging a software program, such as BIOS is provided. The methods and systems make use of a debugger application executing on a host computer and configured to communicate with a debugger module executing on a target computer via serial/parallel/USB port of host computer, an adapter and the SMBus of the target computer.

20 Claims, 5 Drawing Sheets

(56) References Cited

U.S. PATENT DOCUMENTS

| | | |
|---|---|---|
| 6,124,811 A | 9/2000 | Acharya et al. |
| 6,137,455 A | 10/2000 | Duo |
| 6,145,088 A | 11/2000 | Stevens |
| 6,170,021 B1 | 1/2001 | Graf |
| 6,202,070 B1 | 3/2001 | Nguyen et al. |
| 6,209,023 B1 | 3/2001 | Dimitroff et al. |
| 6,219,695 B1 | 4/2001 | Guttag et al. |
| 6,236,884 B1 | 5/2001 | Hunter et al. |
| 6,243,743 B1 | 6/2001 | Freeny |
| 6,249,885 B1 | 6/2001 | Johnson et al. |
| 6,263,373 B1 | 7/2001 | Cromer et al. |
| 6,272,562 B1 | 8/2001 | Scott et al. |
| 6,288,753 B1 | 9/2001 | DeNicola et al. |
| 6,304,895 B1 | 10/2001 | Schneider et al. |
| 6,330,167 B1 | 12/2001 | Kobayashi |
| 6,360,250 B1 | 3/2002 | Anupam et al. |
| 6,377,461 B1 | 4/2002 | Ozmat et al. |
| 6,378,014 B1 | 4/2002 | Shirley |
| 6,389,464 B1 | 5/2002 | Krishnamurthy et al. |
| 6,397,256 B1 | 5/2002 | Chan et al. |
| 6,414,716 B1 | 7/2002 | Kawai |
| 6,434,003 B1 | 8/2002 | Roy et al. |
| 6,442,714 B1 | 8/2002 | Griffin et al. |
| 6,476,854 B1 | 11/2002 | Emerson et al. |
| 6,480,901 B1 | 11/2002 | Weber et al. |
| 6,552,914 B1 | 4/2003 | Chang |
| 6,560,641 B1 | 5/2003 | Powderly et al. |
| 6,594,698 B1 | 7/2003 | Chow et al. |
| 6,601,119 B1 | 7/2003 | Slutz et al. |
| 6,603,665 B1 | 8/2003 | Truong et al. |
| 6,609,034 B1 | 8/2003 | Behrens et al. |
| 6,618,854 B1 | 9/2003 | Mann |
| 6,636,929 B1 | 10/2003 | Hascall et al. |
| 6,636,982 B1 | 10/2003 | Rowlands |
| 6,651,120 B2 | 11/2003 | Chiba et al. |
| 6,651,190 B1 | 11/2003 | Worley et al. |
| 6,662,217 B1 | 12/2003 | Godfrey et al. |
| 6,664,969 B1 | 12/2003 | Emerson et al. |
| 6,681,250 B1 | 1/2004 | Thomas et al. |
| 6,690,410 B1 | 2/2004 | Mochida et al. |
| 6,754,891 B1 | 6/2004 | Snyder et al. |
| 6,779,004 B1 | 8/2004 | Zintel |
| 6,816,917 B2 | 11/2004 | Dicorpo et al. |
| 6,816,963 B1 | 11/2004 | Krithivas et al. |
| 6,820,267 B2 | 11/2004 | Christensen et al. |
| 6,823,401 B2 | 11/2004 | Feather et al. |
| 6,825,846 B2 | 11/2004 | Mondal |
| 6,857,005 B2 | 2/2005 | Kistler et al. |
| 6,859,882 B2 | 2/2005 | Fung |
| 6,894,906 B2 | 5/2005 | Sivertsen |
| 6,907,519 B2 | 6/2005 | Desoli |
| 6,952,743 B2 | 10/2005 | Ortega et al. |
| 6,959,380 B2 | 10/2005 | Dake et al. |
| 6,963,425 B1 | 11/2005 | Nair et al. |
| 6,990,577 B2 | 1/2006 | Autry |
| 6,993,747 B1 | 1/2006 | Friedman |
| 7,003,563 B2 | 2/2006 | Leigh et al. |
| 7,039,229 B2 | 5/2006 | Lin et al. |
| 7,076,400 B2 | 7/2006 | Dulberg et al. |
| 7,085,814 B1 | 8/2006 | Gandhi et al. |
| 7,149,796 B2 | 12/2006 | McDaniel-Sanders et al. |
| 7,165,041 B1 | 1/2007 | Guheen et al. |
| 7,181,510 B2 | 2/2007 | Emerson et al. |
| 7,206,875 B2 | 4/2007 | Marushak et al. |
| 7,209,874 B2 | 4/2007 | Salmonsen |
| 7,231,606 B2 | 6/2007 | Miller et al. |
| 7,233,336 B2 | 6/2007 | Mondal |
| 7,260,624 B2 | 8/2007 | Sivertsen et al. |
| 7,289,334 B2 | 10/2007 | Behrens et al. |
| 7,299,463 B2 | 11/2007 | Brannock et al. |
| 7,349,956 B2 | 3/2008 | Anderson et al. |
| 7,412,625 B2 | 8/2008 | Shankar et al. |
| 7,418,141 B2 | 8/2008 | Messer et al. |
| 7,454,490 B2 | 11/2008 | Sivertsen |
| 7,496,492 B2 | 2/2009 | Dai |
| 7,555,421 B1 | 6/2009 | Beckett et al. |
| 7,640,325 B1 | 12/2009 | DeKoning et al. |
| 7,657,665 B2 | 2/2010 | Dalton et al. |
| 7,702,763 B2 | 4/2010 | Slater et al. |
| 7,801,158 B2 | 9/2010 | Voit et al. |
| 7,840,728 B1 | 11/2010 | Sivertsen |
| 7,861,020 B1 | 12/2010 | Sivertsen |
| 7,945,889 B2 | 5/2011 | Hsu et al. |
| 7,966,391 B2 | 6/2011 | Anderson et al. |
| 8,069,257 B1 | 11/2011 | Bhatia et al. |
| 2001/0027465 A1 | 10/2001 | Hammelbacher |
| 2001/0037366 A1 | 11/2001 | Webb et al. |
| 2002/0040418 A1 | 4/2002 | Bress et al. |
| 2002/0078188 A1 | 6/2002 | Anand et al. |
| 2002/0083156 A1 | 6/2002 | Wysoczynski |
| 2002/0087093 A1 | 7/2002 | Golender et al. |
| 2002/0097234 A1 | 7/2002 | Sauber |
| 2002/0103882 A1 | 8/2002 | Johnston et al. |
| 2002/0124128 A1 | 9/2002 | Qiu |
| 2002/0174415 A1 | 11/2002 | Hines |
| 2002/0178320 A1* | 11/2002 | Wu ............................ 710/306 |
| 2002/0184165 A1 | 12/2002 | Deboer et al. |
| 2002/0194403 A1 | 12/2002 | Pua et al. |
| 2002/0199035 A1 | 12/2002 | Christensen et al. |
| 2003/0023435 A1 | 1/2003 | Josephson |
| 2003/0035049 A1 | 2/2003 | Dickens et al. |
| 2003/0058248 A1 | 3/2003 | Hochmuth et al. |
| 2003/0074606 A1 | 4/2003 | Boker |
| 2003/0083842 A1 | 5/2003 | Miller et al. |
| 2003/0110244 A1 | 6/2003 | Mondal |
| 2003/0120977 A1 | 6/2003 | Tang |
| 2003/0135674 A1 | 7/2003 | Mason et al. |
| 2003/0156132 A1 | 8/2003 | Gn et al. |
| 2003/0177111 A1 | 9/2003 | Egendorf et al. |
| 2003/0200273 A1 | 10/2003 | Khanna et al. |
| 2003/0216891 A1 | 11/2003 | Wegener |
| 2003/0226015 A1 | 12/2003 | Neufeld et al. |
| 2004/0003317 A1* | 1/2004 | Kwatra et al. ................ 714/25 |
| 2004/0054838 A1 | 3/2004 | Hoese et al. |
| 2004/0059782 A1 | 3/2004 | Sivertsen |
| 2004/0139240 A1 | 7/2004 | DiCorpo et al. |
| 2004/0158614 A1 | 8/2004 | Williams |
| 2004/0190773 A1 | 9/2004 | Messer et al. |
| 2004/0199699 A1 | 10/2004 | Bobbitt et al. |
| 2004/0215617 A1 | 10/2004 | Ramsey et al. |
| 2004/0222944 A1 | 11/2004 | Sivertsen |
| 2004/0230668 A1 | 11/2004 | Carnahan et al. |
| 2004/0236843 A1 | 11/2004 | Wing et al. |
| 2004/0243883 A1 | 12/2004 | Shankar et al. |
| 2004/0255276 A1 | 12/2004 | Rovang |
| 2005/0020144 A1* | 1/2005 | Lunecki et al. ............... 439/761 |
| 2005/0021654 A1 | 1/2005 | Kern et al. |
| 2005/0021870 A1 | 1/2005 | Carnahan et al. |
| 2005/0044244 A1 | 2/2005 | Warwick et al. |
| 2005/0066000 A1 | 3/2005 | Liaw et al. |
| 2005/0086670 A1 | 4/2005 | Christensen et al. |
| 2005/0125519 A1 | 6/2005 | Yang et al. |
| 2005/0138346 A1 | 6/2005 | Cauthron |
| 2006/0098670 A1 | 5/2006 | Voit et al. |
| 2006/0189900 A1 | 8/2006 | Flaherty |
| 2006/0195042 A1 | 8/2006 | Flaherty |
| 2007/0168746 A1 | 7/2007 | Righi et al. |
| 2011/0015918 A1 | 1/2011 | Kalbarga |

OTHER PUBLICATIONS

"New KVM Switching System Controls 2,048 Servers Using Cat5 Cable" printout from Raritan website found at http://www.raritan.com//about/abt_press_detail.aspx?&status=4&articleId=127, printed May 23, 2006, 2 pages.

"Z-Series Information Page" printout from Raritan website found at www.Raritan.corn/products/kvm_switches/z_series/prd_line.aspx. Printed Feb. 10, 2006, 1 page.

American Megatrends, Inc., AMIBIOS8, Introduction to AMIBIOS8™: Overview of Key Features in the Latest AMIBIOS®, Version 1.20, Mar. 25, 2002, 22 pages.

American Megatrends, Inc., AMI Debug Source Level Modular Software Debugger, Data Sheet, Dec. 14, 2004, 2 pages.

(56) References Cited

OTHER PUBLICATIONS

American Megatrends, Inc. AMIDebug User's Guide (Version 2.0), 2002, 101 pages.
American Megatrends, Inc. AMIDiag for Windows User's Guide (Version 2.0), Feb. 25, 2002. http://ami.com/support/docc/MAN-DIAG-WIN.pdf, 108 pages.
AVIT Research, Ltyd., I²C Bus Tool, printed from www.avitresearch.co.uk/ on Aug. 29, 2005, 4 pages.
Calibre, "UCA93LV: USB—I²C Communications Adapter for PCs" Jan. 28, 2005, 2 pages.
Raritan Computer, Inc., "Raritan Announces New Paragon CIMs with Innovative DirectConnect Technology," a press release, Jan. 14, 2002, printed from www.raritan.com on Jan. 27, 2005, 2 pages.
Saelig Online Store, UCA93LV, printed from www.saelig.com on Aug. 29, 2005, 2 pages.
QuikSpecs: Compaq PCI Card KVM Switches, Version 5, Mar. 13, 2003, 5 pages.
U.S. Official Action dated Aug. 13, 2003 in U.S. Appl. No. 10/016,484.
U.S. Official Action dated Mar. 8, 2004 in U.S. Appl. No. 10/016,484.
U.S. Official Action dated Jun. 22, 2004 in U.S. Appl. No. 10/016,484.
U.S. Notice of Allowance / Allowability dated Jul. 15, 2004 in U.S. Appl. No. 10/016,484.
U.S. Official Action dated Feb. 23, 2004 in U.S. Appl. No. 10/247,876.
U.S. Official Action dated Aug. 3, 2004 in U.S. Appl. No. 10/247,876.
U.S. Official Action dated Feb. 3, 2005 in U.S. Appl. No. 10/247,876.
U.S. Official Action dated Aug. 8, 2005 in U.S. Appl. No. 10/247,876.
U.S. Official Action dated Feb. 24, 2006 in U.S. Appl. No. 10/247,876.
U.S. Official Action dated Aug. 17, 2006 in U.S. Appl. No. 10/247,876.
U.S. Notice of Allowance / Allowability dated Apr. 11, 2007 in U.S. Appl. No. 10/247,876.
U.S. Official Action dated Sep. 19, 2006 in U.S. Appl. No. 10/403,198.
U.S. Official Action dated Mar. 6, 2007 in U.S. Appl. No. 10/403,198.
U.S. Notice of Allowance / Allowability dated May 31, 2007 in U.S. Appl. No. 10/403,198.
U.S. Notice of Allowance / Allowability dated Sep. 18, 2007 in U.S. Appl. No. 10/403,198.
U.S. Notice of Allowance / Allowability dated Jan. 11, 2008 in U.S. Appl. No. 10/403,198.
U.S. Notice of Allowance / Allowability dated May 13, 2008 in U.S. Appl. No. 10/403,198.
U.S. Official Action dated Jan. 24, 2006 in U.S. Appl. No. 10/446,044.
U.S. Official Action dated Jul. 14, 2006 in U.S. Appl. No. 10/446,044.
U.S. Official Action dated Oct. 5, 2006 in U.S. Appl. No. 10/446,044.
U.S. Official Action dated Apr. 5, 2007 in U.S. Appl. No. 10/446,044.
U.S. Official Action dated Sep. 18, 2007 in U.S. Appl. No. 10/446,044.
U.S. Official Action dated Jan. 8, 2008 in U.S. Appl. No. 10/446,044.
U.S. Notice of Allowance / Allowability dated Jun. 9, 2008 in U.S. Appl. No. 10/446,044.
U.S. Official Action dated Sep. 11, 2006 in U.S. Appl. No. 10/462,509.
U.S. Official Action dated Mar. 6, 2007 in U.S. Appl. No. 10/462,509.
U.S. Official Action dated Jun. 29, 2007 in U.S. Appl. No. 10/462,509.
U.S. Notice of Allowance / Allowability dated Nov. 1, 2007 in U.S. Appl. No. 10/462,509.
U.S. Official Action dated Nov. 29, 2007 in U.S. Appl. No. 10/462,509.
U.S. Official Action dated Jul. 9, 2008 in U.S. Appl. No. 10/462,509.
U.S. Notice of Allowance / Allowability dated Jan. 26, 2009 in U.S. Appl. No. 10/462,509.
U.S. Appl. No. 10/790,160, filed Mar. 1, 2004, entitled "Method, System and Apparatus for Communicating with a Computer Management Device," Inventor: Subash Kalbarga.
U.S. Official Action dated Dec. 17, 2007 in U.S. Appl. No. 10/790,160.
U.S. Official Action dated Jun. 25, 2008 in U.S. Appl. No. 10/790,160.
U.S. Official Action dated Jan. 7, 2009 in U.S. Appl. No. 10/790,160.
U.S. Official Action dated Jul. 1, 2009 in U.S. Appl. No. 10/790,160.
U.S. Official Action dated Dec. 23, 2009 in U.S. Appl. No. 10/790,160.
U.S. Notice of Allowance / Allowability dated Jun. 24, 2010 in U.S. Appl. No. 10/790,160.
U.S. Notice of Allowance / Allowability dated Nov. 10, 2004 in U.S. Appl. No. 10/867,348.
U.S. Official Action dated Feb. 27, 2007 in U.S. Appl. No. 10/867,406.
U.S. Official Action dated Aug. 10, 2007 in U.S. Appl. No. 10/867,406.
U.S. Official Action dated Dec. 27, 2007 in U.S. Appl. No. 10/867,406.
U.S. Notice of Allowance / Allowability dated Jul. 23, 2008 in U.S. Appl. No. 10/867,406.
U.S. Appl. No. 10/875,641, filed Jun. 24, 2004, Entitled "Method and System for Remote Software Debugging," Inventors: Righi et al.
U.S. Official Action dated Jul. 27, 2007 in U.S. Appl. No. 10/875,641.
U.S. Official Action dated Jan. 10, 2008 in U.S. Appl. No. 10/875,641.
U.S. Official Action dated Jun. 3, 2008 in U.S. Appl. No. 10/875,641.
U.S. Notice of Allowance / Allowability dated Jan. 8, 2009 in U.S. Appl. No. 10/875,641.
U.S. Appl. No. 10/926,241, filed Aug. 25, 2004, entitled "Apparatus, Methods, and Systems for Redirecting Input and Output for Multiple Computers," Inventor: Clas Sivertsen.
U.S. Official Action dated Sep. 8, 2008 in U.S. Appl. No. 10/926,241.
U.S. Notice of Allowance / Allowability dated Dec. 2, 2008 in U.S. Appl. No. 10/926,241.
U.S. Official Action dated Apr. 18, 2006 in U.S. Appl. No. 10/966,221.
U.S. Official Action dated Sep. 5, 2006 in U.S. Appl. No. 10/966,221.
U.S. Notice of Allowance / Allowability dated Jan. 5, 2007 in U.S. Appl. No. 10/966,221.
U.S. Official Action dated May 14, 2008 in U.S. Appl. No. 11/300,045.
U.S. Official Action dated Dec. 2, 2008 in U.S. Appl. No. 11/300,045.
U.S. Official Action dated May 27, 2009 in U.S. Appl. No. 11/300,045.
U.S. Official Action dated Dec. 8, 2009 in U.S. Appl. No. 11/300,045.
U.S. Official Action dated Nov. 23, 2010 in 11/300,045.
U.S. Notice of Allowance / Allowability dated Apr. 14, 2011 in U.S. Appl. No. 11/300,045.
U.S. Appl. No. 12/395,015, filed Feb. 27, 2009, entitled "Redirecting Input and Output for Multiple Computers," Inventor: Clas Gerhard Sivertsen.
U.S. Official Action dated Dec. 30, 2009 in U.S. Appl. No. 12/395,015.
U.S. Official Action dated Jun. 18, 2010 in U.S. Appl. No. 12/395,015.
U.S. Notice of Allowance / Allowability dated Aug. 30, 2010 in U.S. Appl. No. 12/395,015.
U.S. Appl. No. 12/395,022, filed Feb. 27, 2009, entitled "Redirecting Input and Output for Multiple Computers," Inventor: Clas Sivertsen.
U.S. Official Action dated Aug. 24, 2009 in U.S. Appl. No. 12/395,022.
U.S. Notice of Allowance / Allowability dated Mar. 11, 2010 in U.S. Appl. No. 12/395,022.
U.S. Appl. No. 12/395,028, filed Feb. 27, 2009, entitled "Redirecting Input and Output for Multiple Computers," Inventor: Clas Sivertsen.
U.S. Official Action dated Apr. 23, 2010 in U.S. Appl. No. 12/395,028.
U.S. Notice of Allowance / Allowability dated Sep. 23, 2010 in U.S. Appl. No. 12/395,028.

(56) References Cited

OTHER PUBLICATIONS

U.S. Appl. No. 12/425,455, filed Apr. 17, 2009, entitled "Method and System for Remote Software Debugging," Inventors: Righi et al.
U.S. Notice of Allowance / Allowability dated Jun. 22, 2011 in U.S. Appl. No. 12/425,455.
U.S. Appl. No. 12/470,854, filed May 22, 2009, entitled "Method and System for Remote Software Testing", Inventor: Gene Rovang.
U.S. Notice of Allowance / Allowability dated Jan. 3, 2011 in U.S. Appl. No. 12/470,854.
U.S. Appl. No. 12/889,933, filed Sep. 24, 2010, entitled "Method, System and Apparatus for Communicating with a Computer Management Device," Inventor: Subash Kalbarga.
U.S. Official Action dated Aug. 16, 2011 in U.S. Appl. No. 12/889,933.
U.S. Appl. No. 12/948,400, filed Nov. 17, 2010, entitled "Redirecting Input and Output for Multiple Computers," Inventor: Clas Sivertsen.
U.S. Official Action dated Dec. 27, 2010 in U.S. Appl. No. 12/948,400.
U.S. Notice of Allowance / Allowability dated Apr. 21, 2011 in U.S. Appl. No. 12/948,400.
U.S. Appl. No. 13/079,141, filed Apr. 4, 2011 entitled "Method and System for Remote Software Testing," First Named Inventor: Stefano Righi.
U.S. Appl. No. 13/240,253, filed Sep. 22, 2011 entitled "Method and System for Remote Software Debugging," First Named Inventor: Stefano Righi.
U.S. Official Action dated Nov. 13, 2012 in U.S. Appl. No. 13/079,141.
U.S. Official Action dated Jun. 5, 2012 in U.S. Appl. No. 12/889,933.
U.S. Notice of Allowance/Allowability dated Oct. 1, 2012 in U.S. Appl. No. 12/889,933.
U.S. Official Action dated Mar. 29, 2013 in U.S. Appl. No. 13/240,253.
U.S. Notice of Allowance/Allowability dated Apr. 11, 2013 in U.S. Appl. No. 13/079,141.
Shimonski, R. "Using Remote Desktop with Windows XP Professional", published Dec. 7, 2004 (Windows XP release date Oct. 25, 2001) [online][retrieved on Mar. 22, 2013] retrieved from: http://www.windowsnetworking.com/articles-tutorials/windows-xp/Using-Rernote-Desktop-Windows-XP-Pro.html, 9 pps.

* cited by examiner

SYSTEM AND METHOD FOR DEBUGGING A TARGET COMPUTER USING SMBUS

CROSS-REFERENCE TO RELATED APPLICATIONS

This application is a continuation of U.S. patent application Ser. No. 11/300,045 filed Dec. 14, 2005, now U.S. Pat. No. 8,010,843, dated Aug. 30, 2011, entitled "System and Method for Debugging a Target Computer Using SMBus," which is hereby incorporated by reference in its entirety.

TECHNICAL FIELD

The present invention relates generally to software debugging, and more specifically to a communication port system and method comprising a USB adapter and the SMBus of a target computer wherein debug commands can be issued from a host computer to the target computer via said communication port.

BACKGROUND

When computers are initially turned on or reset, a "booting" process typically occurs. When a computer "boots" a built-in diagnostic program known as a power-on self-test (POST) is performed wherein various tests are run to confirm core components of the computer system are present and functioning properly, and wherein the registers within certain hardware devices are initialized. Part of performing the POST involves loading the basic input and output system (BIOS) code into memory. A computer system requires BIOS to control the basic hardware operations, such as interactions with disk drives, hard drives, the keyboard, and other peripheral devices. After performing the POST, the computer typically loads an operating system (OS).

More specifically, the BIOS is a collection of instructions known as firmware routines typically hardwired into a read-only-memory (ROM) device and utilized by a processor of a computer to identify, initialize, allocate and manage other system hardware. The BIOS is the lowest-level software in the computer system acting as an interface between the hardware (especially the processor) and higher level programs such as the OS. By providing a set of low-level routines, the BIOS enables the OS to interface with different hardware devices while in operation, thus facilitating the operation of various software applications. The BIOS is also responsible for allowing control of a computer's hardware settings, for booting up the computer when the power is turned on or when the reset button is activated, and various other system functions.

Because BIOS code is so intimately connected to the hardware, developing such BIOS code can be very difficult. Many tools are available to help design and debug BIOS. For example, AMIBIOS Debugger, which is part of the American Megatrends, Inc. suite of programs, allows developers to debug BIOS relatively easily. Many other similar programs for debugging code are known in the art.

Typically, the developer of such BIOS code or a debugger at the BIOS level uses an in-circuit emulator (ICE) as a tool of choice to aid code development and debugging. ICE systems emulate the system processor and allow typical debugging tasks to be performed such as (1) viewing and modifying memory locations, I/O locations, and processor registers, (2) setting and clearing breakpoints, and (3) starting and stopping processor execution. However, ICE hardware and software systems are very expensive, costing on the order of $20,000 or more for a system or platform. Development sites often ration the use of limited ICE debugging tools, forcing developers to use less efficient tools, thereby impacting productivity.

In general, debugging refers to the process of identifying and eliminating errors within the BIOS code. For instance, most debuggers such as AMIBIOS Debugger mentioned herein, provide tools for stepping through the executing code of a program, monitoring the status of input/output ports, and for monitoring and modifying the contents of memory locations and central processing unit ("CPU") registers.

Traditionally, a debugger tool runs on the computer system executing the software that is being debugged. For example, the debugging of one computer (the "target computer") through another computer (the "host computer") is performed via a locally-connected cable (i.e. a serial/USB/parallel cable). Each means of communication has advantages and disadvantages such as cost, speed of data transmission and system resource requirements such as memory to enable communication between the host and target computer. Communication ports on a typical target computer consist of serial/USB/parallel communication ports.

Serial ports essentially, provide a standard connector and protocol allowing the connection of peripheral devices, such as modems, to the computer. The serial port takes a byte of data and transmits the 8 bits in that byte one at a time. The advantage is that a serial port needs only one wire to transmit the 8 bits. In order for the serial port to function faster, a buffer holds data that is going out to the serial port. Most standard serial ports have a maximum transfer rate of 115 Kbps (kilobits per second). In summary, most computers have at most, two serial ports. In addition, serial port controller is not memory intensive to transfer data at such transfer rates.

Parallel ports, essentially, provide a standard connector and protocol to let you attach devices, such as printer, to your computer. The parallel port sends 8 bits of data (1 byte) at the same time. Most standard parallel ports have data transfer rate of ten times faster than serial port transfer rates with an effective bandwidth of approximately 1 Mbs (Megabits per second). Furthermore, parallel ports lack an accepted standard for bi-directional communication. In summary, most computers come with only one parallel port. In addition, the parallel port controller like the serial port controller is not memory intensive to transfer data at such transfer rates.

Devices other than serial and parallel ports that needed faster connections come with their own cards, which must be inserted in an open card slot inside the computer's case.

Recently, the universal serial bus (USB) has been introduced and provides the computer with a single, standardized, easy means to connect multiple peripheral devices to a computer. With USB 2.0, the port has a maximum data transfer rate of 480 megabits per second. However, with faster data transfer rates, the USB controller requires extensive use of memory.

Such communication options occupy either the serial, parallel, or USB port of the target computer.

Therefore, for the foregoing reasons, it is readily apparent that there is a need for a target computer communication port having low cost, higher data communication rates than serial port and memory use requirements similar to that of a serial port while still enabling communication between a target computer and a host computer for debugging POST and BIOS code without occupying a serial, parallel, or USB port of the target computer.

BRIEF DESCRIPTION

Briefly described, in the preferred embodiment, the present invention overcomes the above-mentioned disadvantages and meets the recognized need for such a device, system and method by providing a target computer communication port system and method using an adapter and the system management bus (SMBus) of the target computer, thus enabling communication between a target computer and a host computer for debugging a software program such as POST and BIOS code. The present system and method make use of a debugger application executing on a host computer and configured to communicate with a debugger module executing on a target computer. By allowing the debugger application, executing on the host computer, to communicate over standard USB of the host computer to a USB adapter and SMBus of the target computer, the physical limitations of previous solutions utilizing low speed serial port or memory intensive parallel and USB ports of the target computer to connect the host and target computers is overcome. Communication may be made even though the target computer has not been booted with an operating system program. The debugger application executing on the host computer preferably communicates with the debugger module executing on the target computer via standard USB of the host computer to a USB adapter and SMBus of the target computer in the same manner as if the host and target computers were connected locally via a serial/parallel/USB cable and applicable host and target computer ports.

According to its major aspects and broadly stated, the present invention in its preferred form is a communication port system and method comprising a standard USB port of host computer, a USB adapter and the SMBus of the target computer, wherein debug commands can be issued from a host computer to the target computer via said communication port.

Accordingly, a feature and advantage of the present invention is its ability to enable a low cost communication solution between the host computer and the target computer.

Another feature and advantage of the present invention is its ability to enable a communication solution between the host computer and the target computer without occupying serial/USB/parallel communication ports of the target computer.

Still another feature and advantage of the present invention is its ability to provide a communication platform that is not dependent on the I/O devices such as serial, USB, or parallel rather the present invention can communicate with any selected port on the host computer whether serial, USB, or parallel depending on the type of adapter used.

Yet another feature and advantage of the present invention is its ability to incorporate an adapter that bridges communication between the target computers' SMBus and the hardware configuration of the host computer such as serial/USB/parallel port.

Still yet another feature and advantage of the present invention is its ability to communicate directly with the subsystems of the target computer using the SMBus existing features.

Still yet another feature and advantage of the present invention is its ability to have a unique interface for the SMBus communication instead of using different types such as serial/USB/parallel.

Still yet another feature and advantage of the present invention is its ability to communicate at higher data communication rates than serial port.

Still yet another feature and advantage of the present invention is its ability to efficiently use system memory similar to that of a serial port.

These and other features and advantages of the present version of the invention will become more apparent to one skilled in the art from the following description and claims when read in light of the accompanying drawings.

BRIEF DESCRIPTION OF THE DRAWINGS

The present invention will be better understood by reading the Detailed Description of the Preferred and Selected Alternate Embodiments with reference to the accompanying drawing figures, in which like reference numerals denote similar structure and refer to like elements throughout, and in which.

DETAILED DESCRIPTION OF THE PREFERRED AND SELECTED ALTERNATIVE EMBODIMENTS

Figure 1:
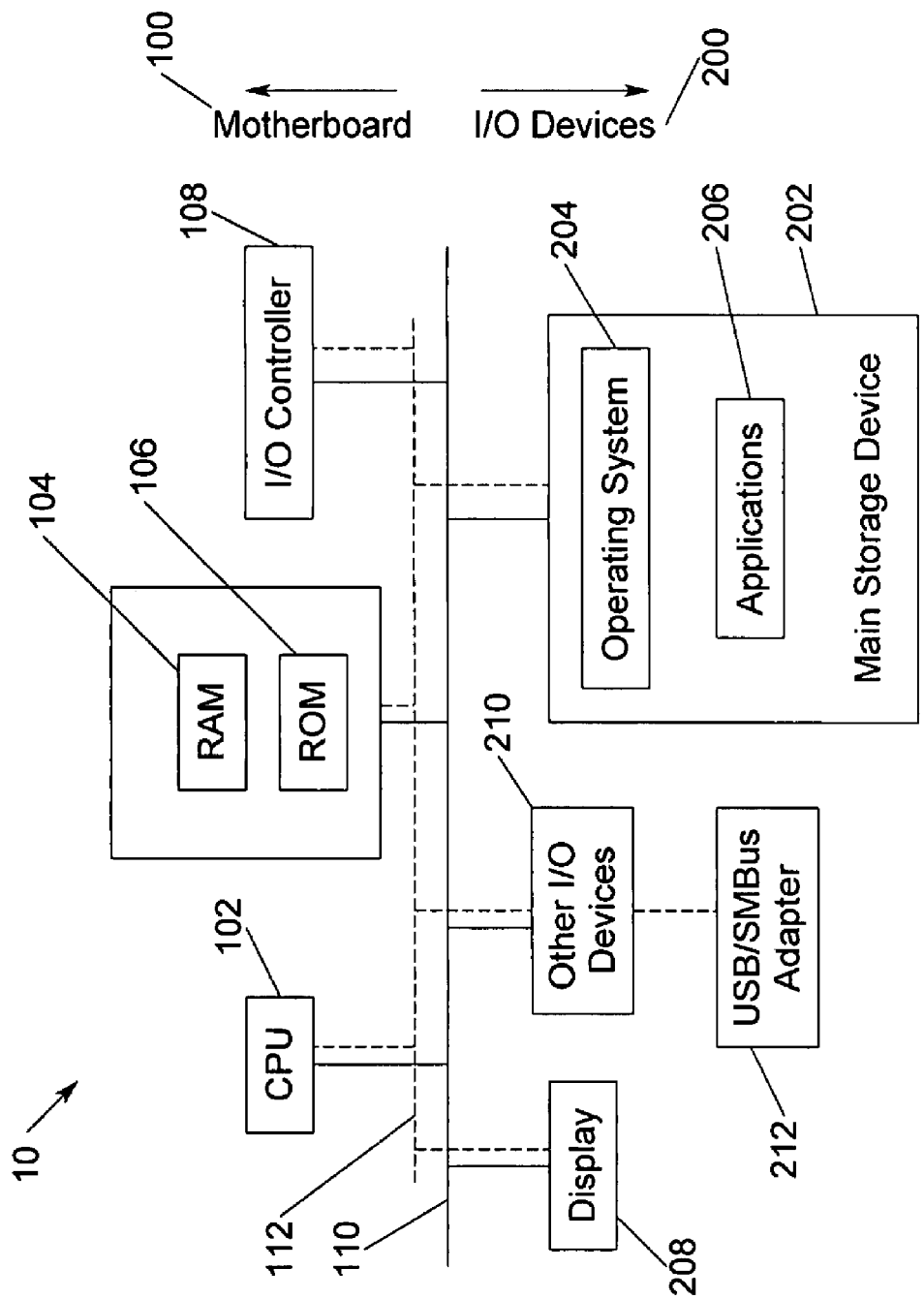
FIG. 1 is a block diagram of a computer system.

In describing the preferred and selected alternate embodiments of the present invention, as illustrated in FIGS. 1-5, specific terminology is employed for the sake of clarity. The present version of the invention, however, is not intended to be limited to the specific terminology so selected, and it is to be understood that each specific element includes all technical equivalents that operate in a similar manner to accomplish similar functions.

As will be appreciated by one of skill in the art, the present invention may be embodied as a method, data processing system, or computer program product.

Accordingly, the present invention may take the form of an entirely hardware embodiment, entirely software embodiment, an embodiment combining software and hardware aspects, or a method of any thereof. Furthermore, the present version of the invention may take the form of a computer program product on a computer-readable storage medium having computer-readable program code means embodied in the medium. Any suitable computer readable medium may be utilized including hard disks, ROM, RAM, CD-ROMs, electrical, optical or magnetic storage devices.

The present invention is described below with reference to flowchart illustrations of methods, apparatus (systems) and computer program products according to embodiments of the present invention. It will be understood that each block or step of the flowchart illustrations, and combinations of blocks or steps in the flowchart illustrations, can be implemented by computer program instructions. These computer program instructions may be loaded onto a general purpose computer, special purpose computer, or other programmable data processing apparatus to produce a machine, such that the instructions, which execute on the computer or other programmable data processing apparatus create means for implementing the functions specified in the flowchart block or blocks/step or steps. Generally, computer programs include routines, modules, components, data structures and other types that perform particular tasks or implement particular abstract data structures.

These computer program instructions may also be stored in a computer-usable memory that can direct a computer or other programmable data processing apparatus to function in a particular manner, such that the instructions stored in the computer-usable memory produce an article of manufacture including instruction means which implement the function specified in the flowchart block or blocks/step or steps. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks/step or steps.

Accordingly, blocks or steps of the flowchart illustrations support combinations of means for performing the specified functions, combinations of steps for performing the specified functions and program instruction means for performing the specified functions. It will also be understood that each block or step of the flowchart illustrations, and combinations of blocks or steps in the flowchart illustrations, can be implemented by special purpose hardware-based computer systems, which perform the specified functions or steps, or combinations of special purpose hardware and computer instructions.

Computer program for implementing the present version of the invention may be written in various programming languages, such as conventional C calling. However, it is understood that other source or object oriented programming languages, and, other conventional programming languages could be utilized without departing from the spirit and intent of the present version of the invention.

Referring now to FIG. 1-5, the present invention in its preferred embodiment is a method, system and/or apparatus for debugging computer systems. More specifically a system for providing a target computer communication port using an adapter and the system management bus (SMBus) of the target computer Referring now to FIG. 1, there is illustrated a block diagram of a computer system 10 that provides a suitable environment for implementing embodiments of the present version of the invention. The computer architecture shown in FIG. 1 is divided into two parts the motherboard 100 and the input/output (I/O) devices 200. The motherboard 100 includes a system bus 110 which interconnects major subsystems such as a central processor (CPU) 102, a random access memory (RAM) 104, an input/output (I/O) controller 108, and read-only memory (ROM) 106, (ROM holds a binary image of the BIOS code also known as firmware). In addition, motherboard 100 includes a system management bus (SMBus) 112 which interconnects major subsystems such as a central processor (CPU) 102, a random access memory (RAM) 104, an input/output (I/O) controller 108, and read-only memory (ROM) 106. SMBus 112 is a two wire interface known as inter-integrated circuit (I2C) through which various subsystems of the computer system can communicate and pass control. I2C-bus compatible devices incorporate an on-chip interface which allows them to communicate directly with each other via the SMBus 112. The SMBus 112 uses two bidirectional communication lines, which are called serial clock line and serial data line. Three speed modes are specified: Standard; 100 kbps (bits per second), Fast mode; 400 kbps, High speed mode 3.4 Mbps. Bus master and bus slave subsystems may be connected to a segment of SMBus 112. Typically, a bus master subsystem initiates a bus transfer between the master and the slave and provides the clock line signals for such transfer. Only one master subsystem may control the bus at one time. Since more than one device subsystem may attempt to take control of the SMBus 112 as a master, SMBus 112 provides an arbitration mechanism that uses a wired AND gate connected to all SMBus 112 subsystems interfacing the SMBus 112.

SMBus 112 historically provides a control bus for system and power management related tasks defining the communication link between an intelligent battery, a charger for the battery and a microcontroller that communicates with the rest of computer system 10. Computer system 10 preferably uses SMBus 112 to pass messages to and from devices instead of tripping individual control lines. Removing the individual control lines reduces pin count. For example SMBus 112 is used to determine the memory size of RAM 104 installed in the motherboard 100 memory sockets.

A basic input output system (BIOS) containing the basic routines that help to transfer information between elements within the computer is stored in the ROM 106 or operably disposed in RAM 104. The computer further includes I/O devices such as a main storage device 202 for storing an operating system 204 and application programs 206 and a display 208 for visual output and/or input of data or information, respectively. The main storage device 202 is connected to the CPU 102 through a main storage controller (not shown) connected to bus 110.

In particular, each CPU 102 is a general-purpose processor, that during normal operation, processes data under the control of operating system 204 and application software 206 stored in RAM 104. The operating system 204 takes over total control of the computer system after the BIOS code hands over control to the operating system 204 at the end of POST. Application software 206 contains instructions that when executed on CPU 102 carry out the operations depicted in the flowcharts set forth herein.

CPU 102 is coupled via bus 110 and peripheral component interconnect (PCI) host-bridge to PCI local bus (represented by 'other I/O devices 210'). PCI host-bridge provides a low latency path through which CPU 102 may directly access PCI devices mapped anywhere within bus memory and/or I/O address spaces. PCI host-bridge also provides a high bandwidth path for allowing PCI devices to directly access RAM 104.

PCI local bus interconnects a number of devices for communication under the control of PCI controller (represented by 'I/O controller 108'). These devices include a small computer system interface (SCSI) controller, which provides an interface to SCSI hard disk, and communications adapter(s), which interface computer system 10 to at least one data communication network over network adapter comprising wired and/or wireless network communications.

PCI local bus may further be coupled to an industry standard architecture (ISA) bus by an expansion bus bridge (represented by 'other I/O devices 210'). ISA bus has an attached I/O (Input/Output) controller (represented by 'I/O controller 108) that interfaces computer system 10 to peripheral input devices such as a keyboard and mouse (not illustrated) and supports external communication via parallel, serial and universal serial bus (USB) ports, respectively.

Many other devices or subsystems (represented by 'other I/O devices 210') may be connected in a similar manner such as, without limitation, a keyboard, a pointing device (e.g., a mouse), floppy disk drive operative to receive a floppy disk, CD-ROM player operative to receive a CD-ROM, personal storage device, such as smart card, static memory or other portable storage device that stores data for a particular user or users and is easily transportable, printer, modem each connected via an I/O adapter, wireless receiver and/or transmitter operative to receive and/or transmit data or information to and/or from a remote location.

Examples of such systems include but are not limited to desktop computer(s), network computer(s), midrange computer(s), or mainframe computer(s). In addition, the computer system may also be a remote or portable computing system such as a laptop computer, a personal digital assistant, or cellular telephone, or other wireless device as well as a stand-alone system or part of a network.

Also, it is not necessary for all of the devices shown in FIG. 1 to be present to practice the invention, as discussed below. Furthermore, the devices and subsystems may be interconnected in different ways from that shown in FIG. 1. The operation of a computer system such as that shown in FIG. 1 is readily known in the art and is not discussed in detail in this application, so as not to overcomplicate the present discussion.

Therefore, in general, the present invention is preferably executed on a computer system that performs computing tasks such as manipulating data from a storage device that is accessible to the computer system.

Figure 2:
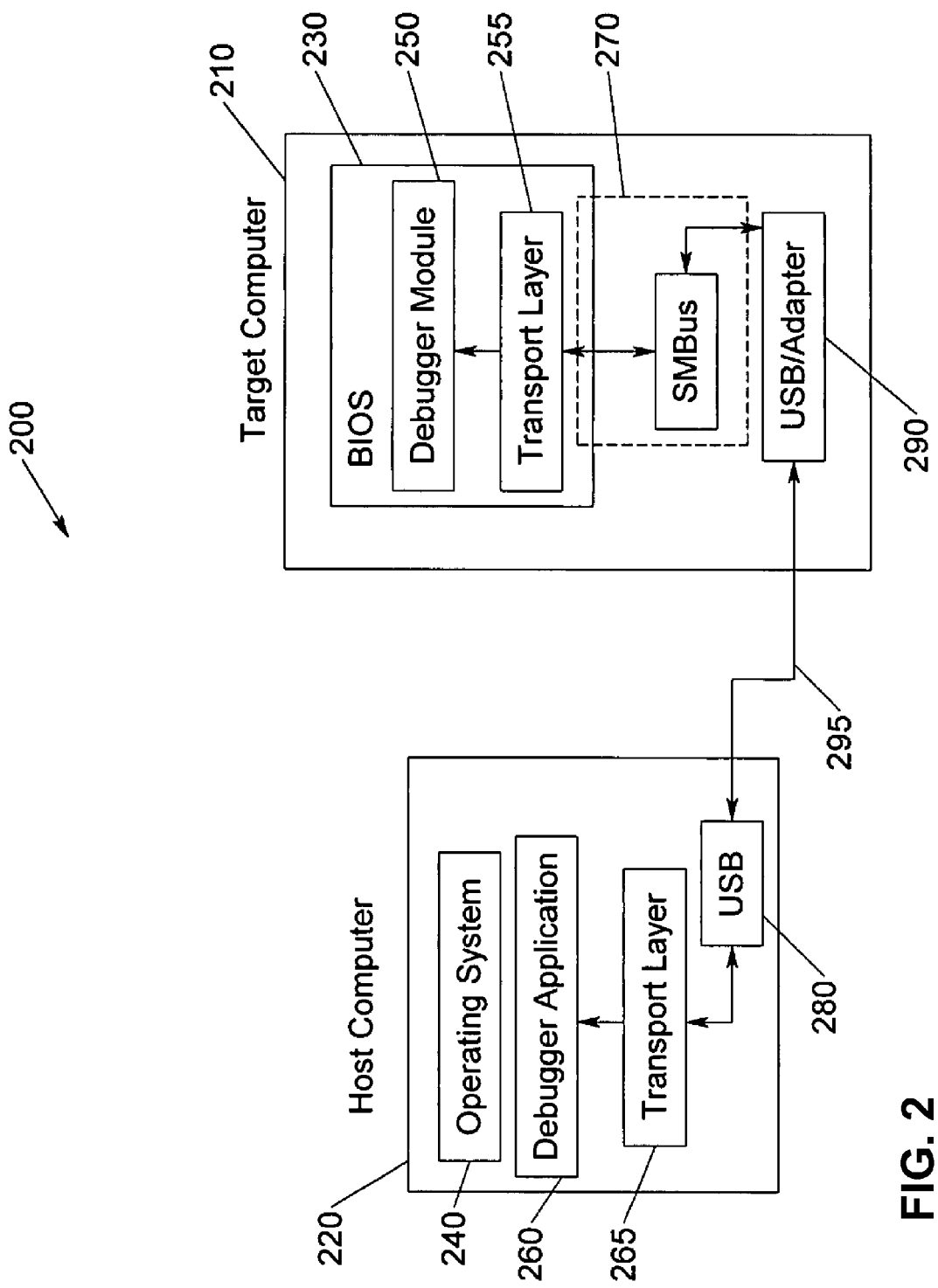
FIG. 2 is a block diagram of a communications system implemented by the system in FIG. 1.

Referring now to FIG. 2, there is illustrated a diagram depicting an exemplary system in which concepts consistent with the present invention may be implemented. Examples of each element within the communication system of FIG. 2 are broadly described above with respect to FIG. 1. In particular, the host computer 220 and target computer 210 have attributes similar to computer system 10 of FIG. 1 and illustrate one possible implementation of that debugger system. Host computer 220 includes a computer-readable medium, such as random access memory and/or read only memory, coupled to a processor. The processor executes program instructions stored in memory.

Similar to host computer 220, target computer 210 includes a computer-readable medium, such as random access memory and/or read only memory, coupled to a processor. The processor executes program instructions stored in memory.

For example, debugger system 200 may include one or more general-purpose computers (e.g., personal computers), one or more special purpose computers (e.g., devices specifically programmed to communicate with each other and/or the debugger system 200), one or more interactive display screens, workstation, server, device, digital assistant or a "smart" cellular telephone or pager, component, other equipment, or some combination of these elements that is capable of responding to and executing instructions. Debugger system 200 may also include a number of additional external or internal devices, such as, without limitation, a mouse, a CD-ROM, a keyboard, a display, interactive display screen, a storage device and other attributes similar to computer system 10 of FIG. 1.

As illustrated in FIG. 2, the debugger system 200 preferably includes a host computer 220 and a target computer 210. The host computer 220 preferably comprises a standard personal or server computer operative to execute a debugger application 260, such as the AMIDEBUG debugging application from American Megatrends, Inc. of Norcross, Ga. Debugger application 260 has attributes similar to applications software 206 of FIG. 1. The host computer 220 is also operative to execute an operating system 240 suitable for controlling the operation of a desktop or server computer such as the WINDOWS XP operating system from Microsoft Corporation of Redmond, Wash., the Linux operating system, or other type of computer operating system.

The debugger system 200 further includes a target computer 210. The target computer 210 preferably comprises a personal or server computer. According to one embodiment of the invention, the target computer 210 is preferably configured with BIOS 230 operative to control the execution of the target computer 210 and to provide other functionality for debugging. The BIOS 230 is also configured with a debugger module 250. In particular, the debugger module 250 is preferably configured to receive and respond to requests for debugging-related information from the debugger application 260, such as the contents of registers or memory locations, to receive and respond to commands received from the debugger application 260, such as for stepping the CPU of the target computer 210 through the execution of program code, and for performing other debugging-related functions.

Debugger application 260 provides conventional debugging tools and commands. Debugger application 260 may depend on the target computer 210 being debugged and the BIOS 230 running on target computer 210. Typical command capabilities provided by debug software may comprise: memory dump, move memory data, modify memory content, trace, break address, replace debug code, exit process, go execute process, go to next debug code and stop, interrupt set, break address replace, disable break address, disassembly of the next instruction, initialize parallel port, dump registers, dump output of debug session to file, symbolic debugging, help, and the like. Debugger module 250 receives debug commands from host computer 220 and responds with appropriate action and/or communicates debug data back to host computer 220.

In order for the host computer 220 to communicate with target computer 210 a communication path between the two computers is established. In a preferred embodiment host computer 220 preferably includes transport layer 265 and USB 280. In addition, in a preferred embodiment target computer 210 preferably includes transport layer 255, SMBus 270 and USB/Adapter 290. The transport layers 255 and 265 define the data transmission between host computer 220 and target computer 210. Such layer supports peripheral interfaces for its data transmission, such as serial port, parallel port and USB port. The existence of these interfaces depends on the host computer 220 and target computer 210 hardware configurations.

USB/Adapter 290 is operative to convert data received from the host computer 220 via USB 280 to a format compatible for transmission on SMBus 270 and to convert data being sent by target computer 210 to a format compatible for transmission via USB 280. Through this communication path, any of the debugging functions described herein, including updating the BIOS, may be performed.

In order to debug aspects of the BIOS 230 and other aspects of the execution of the target computer 210, the debugger application 260 preferably is configured to communicate with the target computer 210 using transport layer 265 and USB 280 of host computer 220, and USB cable 295. The debugger module 250 preferably is configured to communicate with the host computer 220 using transport layer 255, SMBus 270 of target computer 210, and USB/Adapter 290. In particular, commands may be transmitted from the debugger application 260 to the debugger module 250 for debugging the BIOS 230. Moreover, data and other information regarding the execution of the BIOS 230 or other program modules on the target computer 210 may be returned to the debugger application 260 from the debugger module 250. SMBus 270 is similar to SMBus 112 of computer system 10 of FIG. 1. SMBus 270 preferably is used to facilitate debugging by communicating debug code issued by host computer 220 to target computer 210, which responds with appropriate action and/or communicates debug data back to host computer 220.

Transport layers 265 and 255 are the layers that define the data transmission between host computer 220 and target computer 210. Transport layer 265 and 255 support peripheral interfaces for data transmission, such as serial port, parallel port and USB port. The existence of these interfaces depends on the hardware configuration of the host computer 220 and target computer 210. In addition, by using the SMBus 270 of the target computer 210 to communicate data from the host computer 220 to the target computer 210 the peripheral interfaces such as serial port; parallel port and USB port of the target computer 210 are unused during the debug communication and remain available for other tasks.

According to one embodiment of the invention, the BIOS 230 is configured with a debugger module 250 operative to allow the updating of the BIOS 230. In this manner, the debugger application 260 may be utilized to identify execution errors within the BIOS 230. Once errors have been identified and the BIOS code has been corrected, a new version of the BIOS 230 may be uploaded to the target computer 210 using USB 280 of host computer 220 and USB cable 295, and using USB/Adapter 290 and SMBus 270 of target computer 210 (Physical Layer), and programmed, or "flashed", into the non-volatile storage area of the target computer 210 that stores the BIOS 230. It should be appreciated that, no operating system need be present or executing on target computer 210. It should be further appreciated that any conventional debugging function supported by the debugger application 260 may be performed over the Physical Layer utilizing the system illustrated in FIG. 2.

As illustrated in FIG. 2, the preferred communication link includes USB 280 of host computer 220, through USB cable 295 to USB/Adapter 290 of target computer 210, which shall be defined as the physical layer (Physical Layer). It should be appreciated that other types of communication adapters may be utilized in place of the USB/Adapter 290 and interface at the host computer 220 including, but not limited to serial and parallel interface and adapters.

Figure 3:
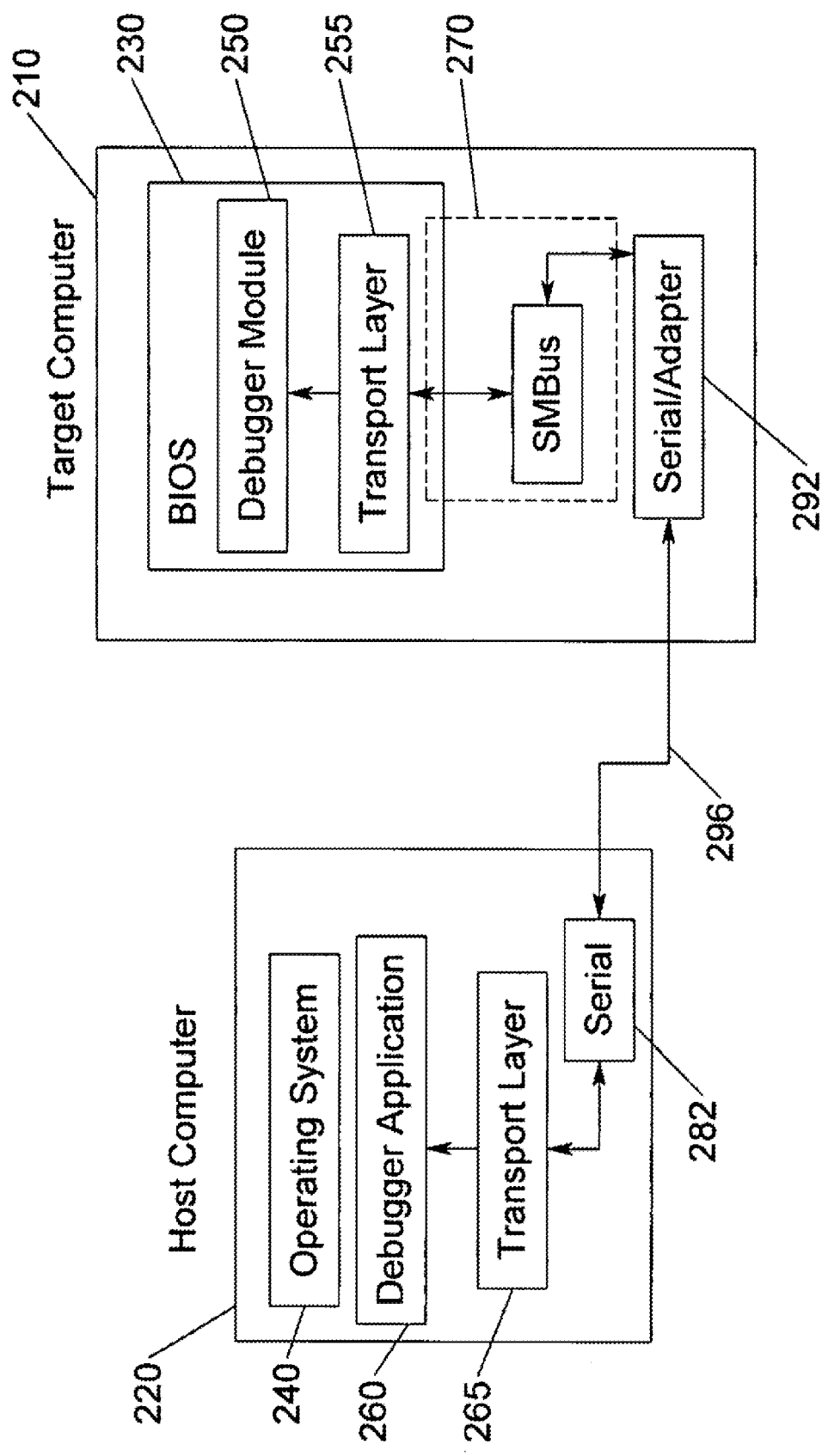
FIG. 3 is a block diagram of a communications system implemented by the system in FIG. 1.

Referring now to FIG. 3, there is illustrated a diagram depicting an exemplary system in which concepts consistent with the present version of the invention may be implemented. Examples of each element within the communication system of FIG. 3 are broadly described above with respect to FIG. 1. In particular, the host computer 220 and target computer 210 have attributes similar to computer system 10 of FIG. 1 and illustrate one possible implementation of that debugger system.

It is contemplated in an alternate embodiment of the present invention as illustrated in FIG. 3, that the Physical Layer preferably includes serial port 282 of host computer 220, serial cable 296, and serial/adapter 292 and SMBus 270 of target computer 210.

Serial/adapter 292 is operative to convert data received from the host computer 220 via serial port 282 to a format compatible for transmission on SMBus 270 and to convert data being sent by target computer 210 to a format compatible for transmission via serial port 282. Through this communication path, any of the debugging functions described herein, including updating the BIOS, may be performed.

Figure 4:
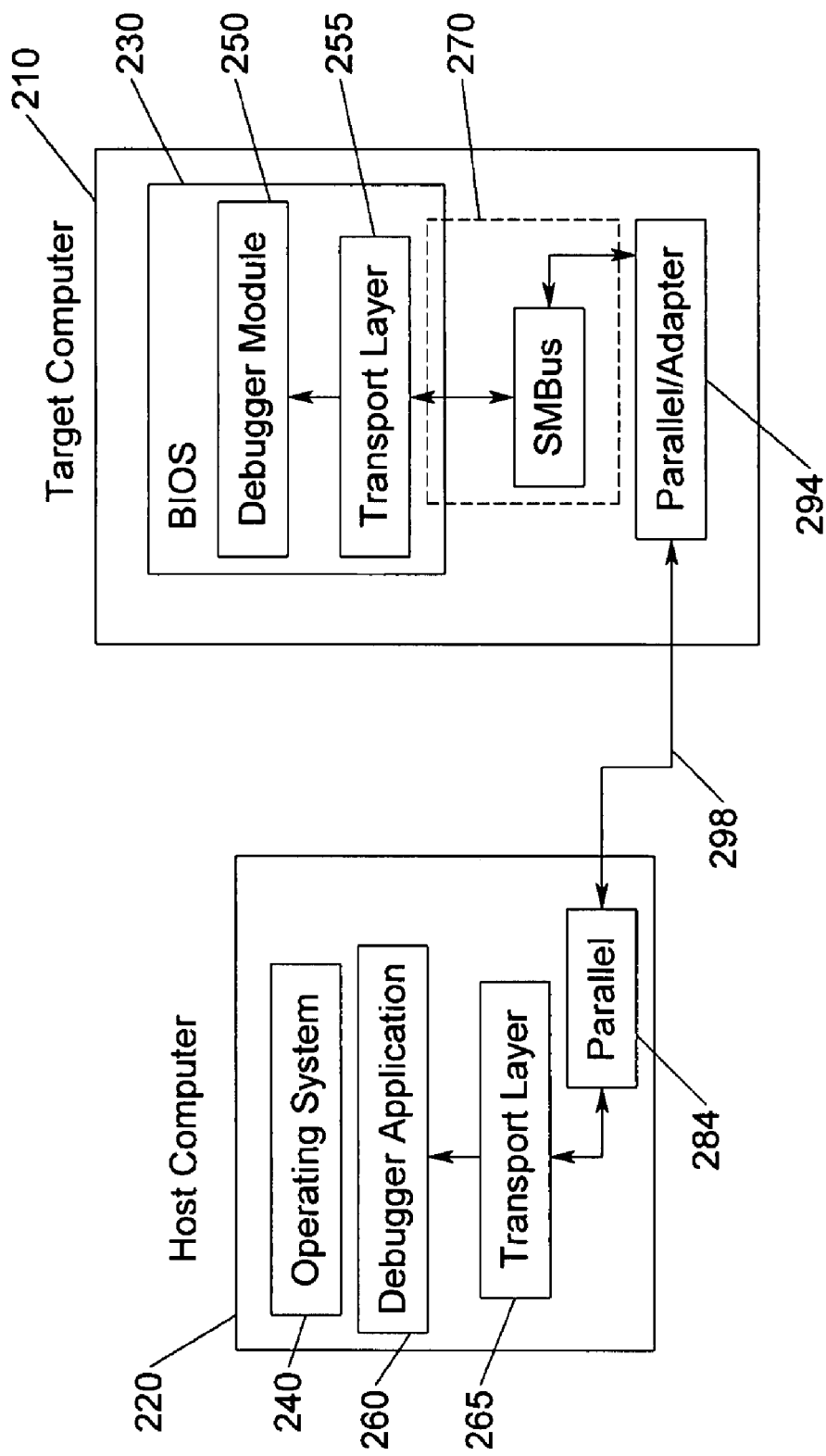
FIG. 4 is a block diagram of a communications system implemented by the system in FIG. 1.

Referring now to FIG. 4, there is illustrated a diagram depicting an exemplary system in which concepts consistent with the present invention may be implemented. Examples of each element within the communication system of FIG. 4 are broadly described above with respect to FIG. 1. In particular, the host computer 220 and target computer 210 have attributes similar to computer system 10 of FIG. 1 and illustrate one possible implementation of that debugger system.

It is contemplated further in another alternate embodiment of the present invention as illustrated in FIG. 4, that the Physical Layer preferably includes parallel port 284 of host computer 220, parallel cable 298, and parallel/adapter 294 and SMBus 270 of target computer 210.

Parallel/adapter 294 is operative to convert data received from the host computer 220 via parallel port 284 to a format compatible for transmission on SMBus 270 and to convert data being sent by target computer 210 to a format compatible for transmission via parallel port 284. Through this communication path, any of the debugging functions described herein, including updating the BIOS, may be performed.

Alternate modes of communication in addition to serial, parallel, USB for the Physical Layer, such as fiber optic or infrared communications are also possible. Thus, allowing system 200, 300, and 400 to use SMBus 270 as an interface device, instead of using the target computer 210 standard communication device interface.

The logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention.

Figure 5:
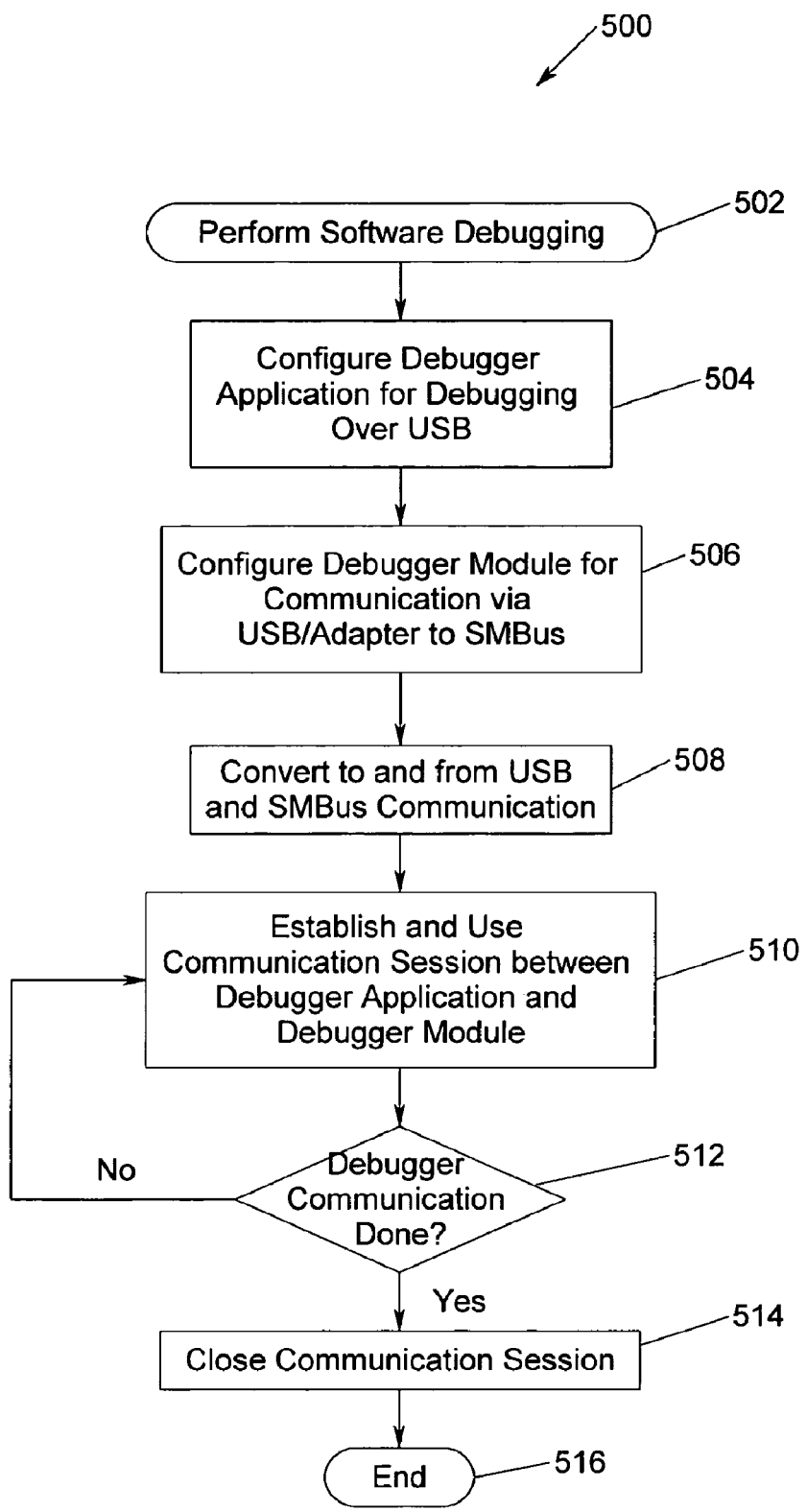
FIG. 5 is a flow diagram of a communication method, according to the preferred embodiment of the present version of the invention, implemented by the system in FIG. 2, 3 or 4.

Referring now to FIG. 5, there is illustrated a preferred flow diagram in which host computer 220 and target computer 210 interact according to a process 500 within the communication system 200 of FIG. 2.

As illustrated in FIG. 5, a process is described illustrating the operation of debugging software, such as for BIOS. Process 500 begins at operation 502, wherein process 500 begins performing software debugging of software on target computer 210 (block 502). From block 502, process 500 continues to operation 504, wherein the debugger application 260 is preferably configured for communicating to debugger module 250 via transport layer 265 and USB 280 of host computer 220. From block 504, the process 500 continues to operation 506, where the debugger module 250 is preferably configured for communicating to debugger application 260 via transport layer 255, SMBus 270 and USB/Adapter 290.

From block 506, the process 500 continues to operation 508, wherein communication sent from debugger application 260 via transport layer 265 and USB 280 is received by USB/Adapter 290 and converted to a format compatible with SMBus 270, and the communication received from debugger module 250 via transport layer 255 and SMBus 270 is converted to a format compatible with USB 280. As described above with respect to FIG. 2, debugger module 250 preferably is configured for use with USB 280. Otherwise, the debugger module 250 may be configured for use with serial/adapter 292 or parallel/adapter 294.

From block 508, the process 500 continues to operation 510, wherein the established communication session between the debugger application 260 and debugger module 255 is utilized to transmit commands and data for debugging the software executing on the target computer 210. The process 500 then continues to operation 512, where a determination is made as to whether the communication session has ended. If the communication session has not ended, the process 500 branches back to operation 510 where the debugging session continues. If, however, the communication session has completed, then process 500 continues to block 514, where the data communications link between the debugger application 260 and the debugger module 250 is closed. The process 500 then continues to block 516, where process 500 ends.

Also, it may not be necessary for all of the blocks/steps shown in FIG. 5 to be present to practice the present invention. Furthermore, the method/process may be interconnected or ordered in different ways from that shown in FIG. 5.

Although the description given above includes specific examples of currently envisioned embodiments of the computer program, method, system, and/or apparatus, these possibilities should not be understood as limiting the scope of the present invention but rather as providing illustrations of some of the embodiments that are now preferred. Examples of alternate embodiments are also described and various other alternatives, adaptations, and modifications may be made within the scope of the present invention. Merely listing or numbering the steps or blocks of a method in a certain order does not constitute any limitation on the order of the steps of that method. Many modifications and other embodiments of the invention will come to mind to one skilled in the art to which this invention pertains having the benefit of the teachings presented in the foregoing descriptions and the associated drawings. Although specific terms may be employed herein, they are used in a generic and descriptive sense only and not for purposes of limitation. Accordingly, the claims that follow herein and their legal equivalents, rather than the examples given in the specification, should determine the scope of present invention.

What is claimed is:

1. A target computer comprising:
a system management bus;
an adapter coupled to the system management bus, the adapter being configured to
receive debugging commands in a first format from a debugger application executing on a host computer via an interface corresponding to the first format,
convert the debugging commands from the first format compatible with the interface to a second format compatible with the system management bus, and to
send the debugging commands in the second format to the system management bus; and
a basic input/output system (BIOS) having a debugger module stored therein, the debugger module being configured to receive the debugging commands in the second format from the adapter via the system management bus and to respond to the debugging commands in the second format.

2. The target computer of claim 1, wherein the debugging commands comprise a command to program the BIOS.

3. The target computer of claim 1, wherein:
the interface to the host computer comprises a universal serial bus (USB) interface;
the debugging commands in the first format comprise debugging commands in the first format compatible with the USB interface; and
the adapter is further configured to convert the debugging commands in the first format compatible with the USB interface to the debugging commands in the second format compatible with the system management bus.

4. The target computer of claim 1, wherein:
the interface to the host computer comprises a parallel communication interface;
the debugging commands in the first format comprise debugging commands in the first format compatible with the parallel communication interface; and
the adapter is configured to convert the debugging commands in the first format compatible with the parallel communication interface to the debugging commands in the second format compatible with the system management bus.

5. The target computer of claim 1, wherein:
the interface to the host computer comprises a serial communication interface;
the debugging commands in the first format comprise debugging commands in the first format compatible with the serial communication interface; and
the adapter is further configured to convert the debugging commands in the first format compatible with the serial communication interface to the debugging commands in the second format compatible with the system management bus.

6. The target computer of claim 1, further comprising a memory upon which no operating system is installed.

7. The target computer of claim 1, wherein the system management bus further operates as an interface device to the host computer.

8. A computer-implemented method for software debugging, the computer-implemented method comprising performing computer-implemented operations for:
receiving, using an adapter of a target computer, debugging commands in a first format from a debugger application executing on a host computer via an interface corresponding to the first format;
converting, using the adapter of the target computer, the debugging commands from the first format compatible with the interface to a second format compatible with a system management bus of the target computer to which the adapter is coupled;
sending, using the adapter of the target computer, the debugging commands in the second format to the system management bus;
receiving, using a debugger module stored within a basic input/output system (BIOS) of the target computer, the debugging commands in the second format from the adapter via the system management bus; and
responding, using the debugger module of the BIOS of the target computer, to the debugging commands.

9. The computer-implemented method of claim 8, wherein the debugging commands comprise a command to program the BIOS.

10. The computer-implemented method of claim 8, wherein:
the interface to the host computer comprises a universal serial bus (USB) interface;
the debugging commands in the first format comprise debugging commands in the first format compatible with the USB interface; and
converting the debugging commands in the first format compatible with the interface to debugging commands in the second format compatible with the system management bus comprises converting the debugging commands in the first format compatible with the USB interface to the debugging commands in the second format compatible with the system management bus.

11. The computer-implemented method of claim 8, wherein:
the interface to the host computer comprises a parallel communication interface;
the debugging commands in the first format comprise debugging commands in the first format compatible with the parallel communication interface; and
converting the debugging commands in the first format compatible with the interface to debugging commands in the second format compatible with the system management bus comprises converting the debugging commands in the first format compatible with the parallel communication interface to the debugging commands in the second format compatible with the system management bus.

12. The computer-implemented method of claim 8, wherein:
the interface to the host computer comprises a serial communication interface;
the debugging commands in the first format comprise debugging commands in the first format compatible with the serial communication interface; and
converting the debugging commands in the first format compatible with the interface to debugging commands in the second format compatible with the system management bus comprises converting the debugging commands in the first format compatible with the serial communication interface to the debugging commands in the second format compatible with the system management bus.

13. The computer-implemented method of claim 8, wherein no operating system is installed on the target computer.

14. A target computer comprising:
a basic input/output system (BIOS) having a debugger module stored therein;
a system management bus; and
an adapter coupled to the system management bus, the adapter being configured to
receive, via an interface, a request for debugging-related information from a debug application executing on a host computer,
convert the request from a format compatible with the interface to a format compatible with the system management bus, and
send the request in the format compatible with the system management bus to the debugger module;
the debugger module being configured to
receive, via the system management bus, the request in the format compatible with the system management bus from the adapter, and
in response to receiving the request, transmit, via the system management bus, the debugging-related information in the format compatible with the system management bus to the adapter; and
the adapter being further configured to
receive, via the system management bus, the debugging-related information from the debugger module,
convert the debugging-related information from the format compatible with the system management bus to the format compatible with the interface, and
transmit, via the adapter, the debugging-related information in the format compatible with the interface to the host computer.

15. The target computer of claim 14, wherein:
the adapter is further configured to
receive debugging commands in a first format from the debug application executed on the host computer via the interface corresponding to the first format, and
convert the debugging commands in the first format compatible with the interface to debugging commands in a second format compatible with the system management bus; and
wherein the debugger module is further configured to receive and respond to the debugging commands in the second format from the adapter.

16. The target computer of claim 15, wherein the debugging commands comprise a command to program the BIOS.

17. The target computer of claim 15, wherein:
the interface to the host computer comprises a universal serial bus (USB) interface;
the debugging commands in the first format comprise debugging commands in the first format compatible with the USB interface; and
the adapter is configured to convert the debugging commands in the first format compatible with the USB interface to the debugging commands in the second format compatible with the system management bus.

18. The target computer of claim 15, wherein:
the interface to the host computer comprises a parallel communication interface;
the debugging commands in the first format comprise debugging commands in the first format compatible with the parallel communication interface; and
the adapter is further configured to convert the debugging commands in the first format compatible with the parallel communication interface to the debugging commands in the second format compatible with the system management bus.

19. The target computer of claim 15, wherein:
the interface to the host computer comprises a serial communication interface;
the debugging commands in the first format comprise debugging commands in the first format compatible with the serial communication interface; and
the adapter is further configured to convert the debugging commands in the first format compatible with the serial communication interface to the debugging commands in the second format compatible with the system management bus.

20. The target computer of claim 14, further comprising a memory upon which no operating system is installed.

* * * * *